US012689208B2

(12) United States Patent
Li

(10) Patent No.: US 12,689,208 B2
(45) Date of Patent: Jul. 21, 2026

(54) SURGE SUPPRESSOR AND METHOD OF OPERATING THE SAME

(71) Applicant: DELTA ELECTRONICS, INC.,
Taoyuan City (TW)

(72) Inventor: Sheng-Hua Li, Taoyuan City (TW)

(73) Assignee: DELTA ELECTRONICS, INC.,
Taoyuan City (TW)

( * ) Notice: Subject to any disclaimer, the term of this patent is extended or adjusted under 35 U.S.C. 154(b) by 161 days.

(21) Appl. No.: 18/676,838

(22) Filed: May 29, 2024

(65) Prior Publication Data

US 2025/0226652 A1 Jul. 10, 2025

(30) Foreign Application Priority Data

Jan. 10, 2024 (CN) .......................... 202410035482.8

(51) Int. Cl.
*H02H 9/02* (2006.01)
(52) U.S. Cl.
CPC ..................................... *H02H 9/02* (2013.01)
(58) Field of Classification Search
CPC ........................................................ H02H 9/02
See application file for complete search history.

(56) References Cited

U.S. PATENT DOCUMENTS

| | | | |
|---|---|---|---|
| 10,756,535 B2 | 8/2020 | Tang et al. | |
| 2007/0121257 A1* | 5/2007 | Maitra | H01H 9/542 |
| | | | 361/2 |
| 2015/0229121 A1 | 8/2015 | Davidson | |

FOREIGN PATENT DOCUMENTS

| | | | | | |
|---|---|---|---|---|---|
| CN | 109787206 A | * | 5/2019 | | |
| CN | 107645154 B | | 3/2020 | | |
| CN | 113257597 A | | 8/2021 | | |
| CN | 115764825 A | | 3/2023 | | |
| CN | 115864814 A | | 3/2023 | | |
| CN | 116014666 A | | 4/2023 | | |
| WO | 2014029542 A1 | | 2/2014 | | |
| WO | WO-2020038120 A1 | * | 2/2020 | ............. | H02H 9/041 |

OTHER PUBLICATIONS

Search Report dated Dec. 6, 2024 of the corresponding European patent application No. 24181410.2.

* cited by examiner

*Primary Examiner* — Scott Bauer
(74) *Attorney, Agent, or Firm* — MUNCY, GEISSLER, OLDS & LOWE, P.C.

(57) ABSTRACT

A surge suppressor is connected in parallel to a circuit breaker of an input path of a MVAC conversion circuit. The surge suppressor includes a plurality of surge suppression circuits, and each surge suppression circuit includes a rectification circuit, a switch, a controller, and a conversion circuit. The rectification circuit includes an AC terminal and a rectification terminal, and the AC terminals of the surge suppression circuits are coupled in series. The switch is coupled to the rectifier terminal, the controller receives a control command and provides a control signal according to the control command. The conversion circuit is coupled to the controller and the switch, and provides a control voltage modulated by the control signal. The control voltage adjusts an on-resistance of the switch to adjust a magnitude of a first current flowing through the switch.

15 Claims, 11 Drawing Sheets

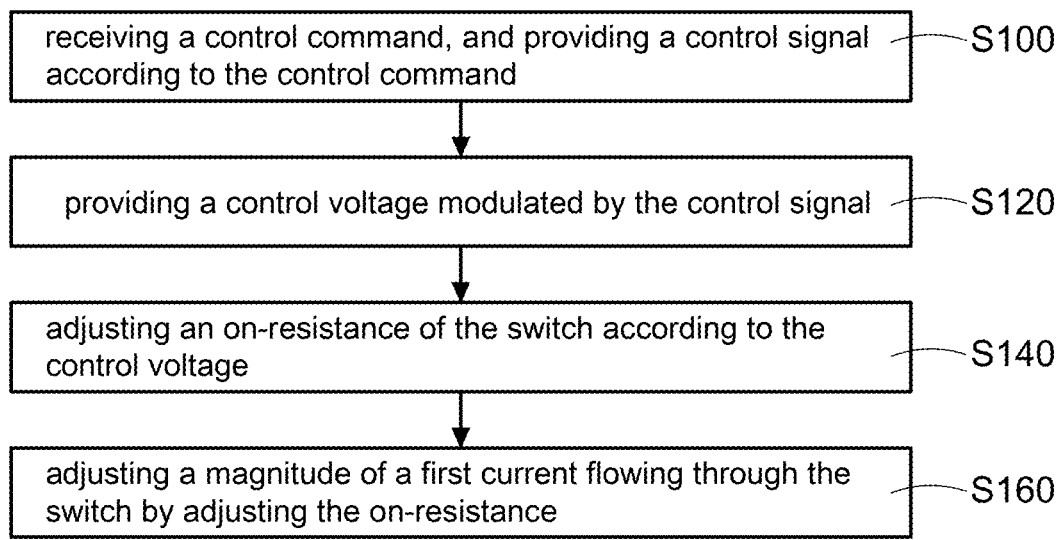

receiving a control command, and providing a control signal according to the control command —— S100 providing a control voltage modulated by the control signal —— S120 adjusting an on-resistance of the switch according to the control voltage —— S140 adjusting a magnitude of a first current flowing through the switch by adjusting the on-resistance —— S160

FIG.5A

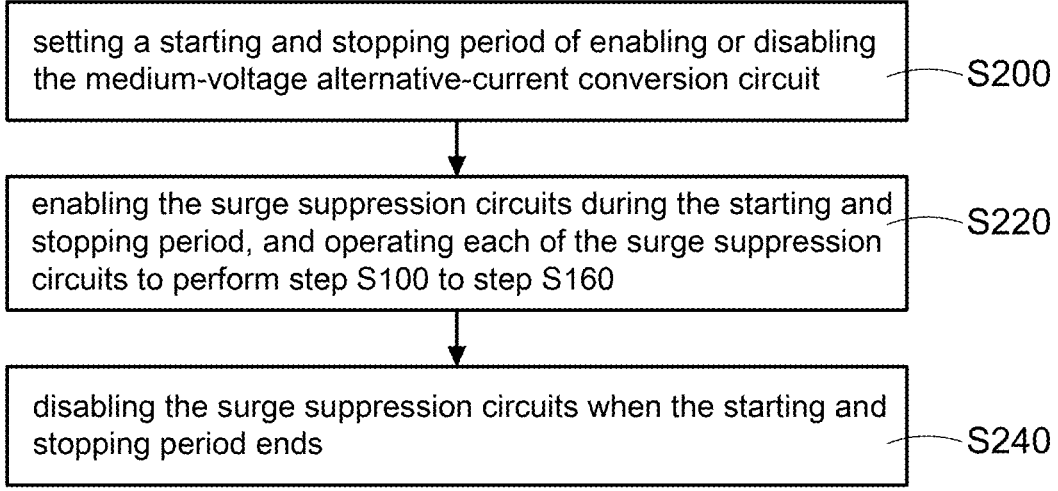

setting a starting and stopping period of enabling or disabling the medium-voltage alternative-current conversion circuit —— S200 enabling the surge suppression circuits during the starting and stopping period, and operating each of the surge suppression circuits to perform step S100 to step S160 —— S220 disabling the surge suppression circuits when the starting and stopping period ends —— S240

FIG.5B

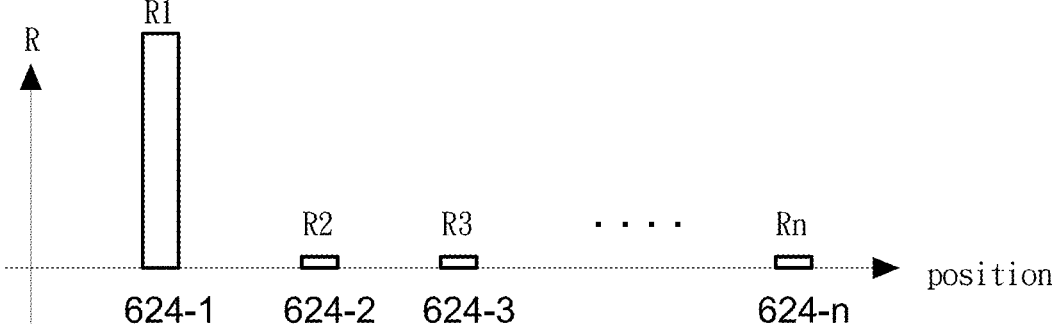
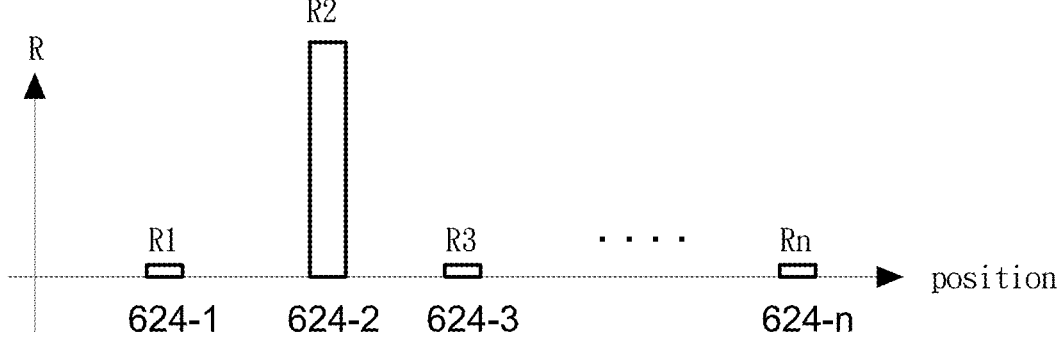
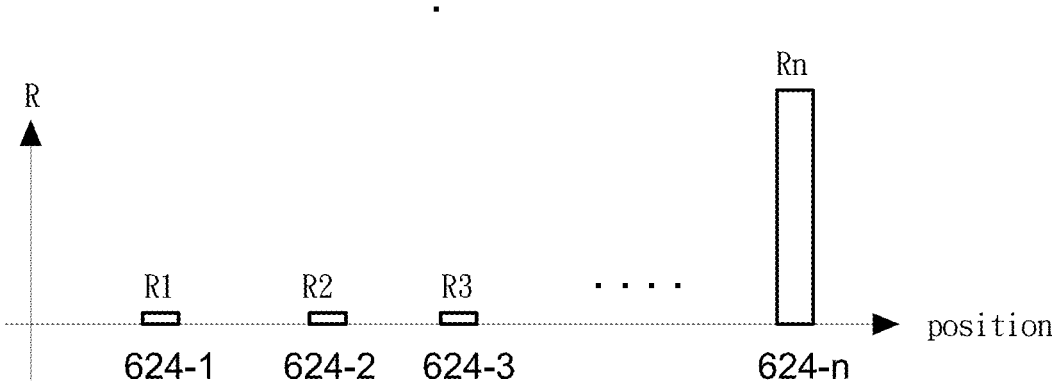
FIG.6B

SURGE SUPPRESSOR AND METHOD OF OPERATING THE SAME

BACKGROUND

Technical Field

The present disclosure relates to a surge suppressor and a method of operating the same, and more particularly to a surge suppressor applied to an MVAC power supply system.

Description of Related Art

The statements in this section merely provide background information related to the present disclosure and do not necessarily constitute prior art.

FIG. 1A shows a block diagram of a related-art medium-voltage alternative-current (MVAC) power supply system, and FIG. 1B shows schematic waveform diagrams of an input voltage and an input current of the related-art MVAC power supply system. The MVAC usually refers to an input voltage Vac greater than 1500 volts, or even as high as tens of kilovolts. Therefore, the MVAC power supply system 100A can generally receive an input voltage Vac of the MVAC that is basically at the kilovolt level. Since the rear end of the traditional MVAC power supply system 100A uses a traditional MV transformer T for power transmission and provides electrical isolation function, it has the disadvantages of being bulky and difficult to configure. Moreover, when the MVAC power supply system 100A is started, if its input voltage Vac is high, there may be an excessively high input current Iac surge caused by the traditional MV transformer T, and the peak value of the surge is even nearly ten times the rated current. Therefore, the front-end circuit breaker will be forced to use a larger-capacity MV circuit breaker (VCB), thereby increasing system costs.

In order to limit the current surge caused by the traditional MV transformer T when the MVAC power supply system 100A is started, a common practice is to add a thermistor NTC. Although the thermistor NTC can limit the current surge caused by the traditional MV transformer T, the characteristics of the thermistor NTC will cause continuous power loss during the operation of the MVAC power supply system 100A. Therefore, the MVAC power supply system 100A will inevitably increase additional power loss during operation.

Therefore, how to design a surge suppressor and a method of operating the same to limit current surges caused by transient effects in MVAC power supply system has become a critical topic in this field.

SUMMARY

In order to solve the above-mentioned problems, the present disclosure provides a surge suppressor. The surge suppressor is connected in parallel to a circuit breaker on an input path of a medium-voltage alternative-current conversion circuit. The surge suppressor includes a plurality of surge suppression circuits. Each surge suppression circuit includes a rectification circuit, a switch, a controller, and a conversion circuit. The rectification circuit includes an alternative-current terminal and a rectification terminal, and the alternative-current terminals of the surge suppression circuits are coupled in series. The switch is coupled to the rectification terminal. The controller receives a control command, and provides a control signal according to the control command. The conversion circuit is coupled to the controller and the switch, and the conversion circuit provides a control voltage modulated by the control signal. The control voltage adjusts an on-resistance of the switch so as to adjust a magnitude of a first current flowing through the switch.

In order to solve the above-mentioned problems, the present disclosure provides a method of operating a surge suppressor. The surge suppressor is connected in parallel to a circuit breaker on an input path of a medium-voltage alternative-current conversion circuit, and the surge suppressor includes a plurality of surge suppression circuits coupled in series, and each surge suppression circuit includes a rectification terminal and a switch coupled to the rectification terminal. The method of operating the surge suppressor includes steps of: (a) receiving a control command, and providing a control signal according to the control command, (b) providing a control voltage modulated by the control signal, (c) adjusting an on-resistance of the switch according to the control voltage, and (d) adjusting a magnitude of a first current flowing through the switch by adjusting the on-resistance.

The main purpose and effect of the present disclosure is to adjust the on-resistance of each surge suppression circuit in an MVAC power supply system, and therefore a magnitude of the first current flowing through the switch can be adjusted to suppress the surge of the input current due to transient effects.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 5A is a flowchart of a method of operating a surge suppressor according to the present disclosure.

FIG. 5B is a flowchart of operating the surge suppressor during a starting and stopping period according to the present disclosure.

FIG. 6B is a schematic diagram of adjusting the on-resistance during the starting and stopping period according to a second embodiment of the present disclosure.

DETAILED DESCRIPTION

Figure 1A:
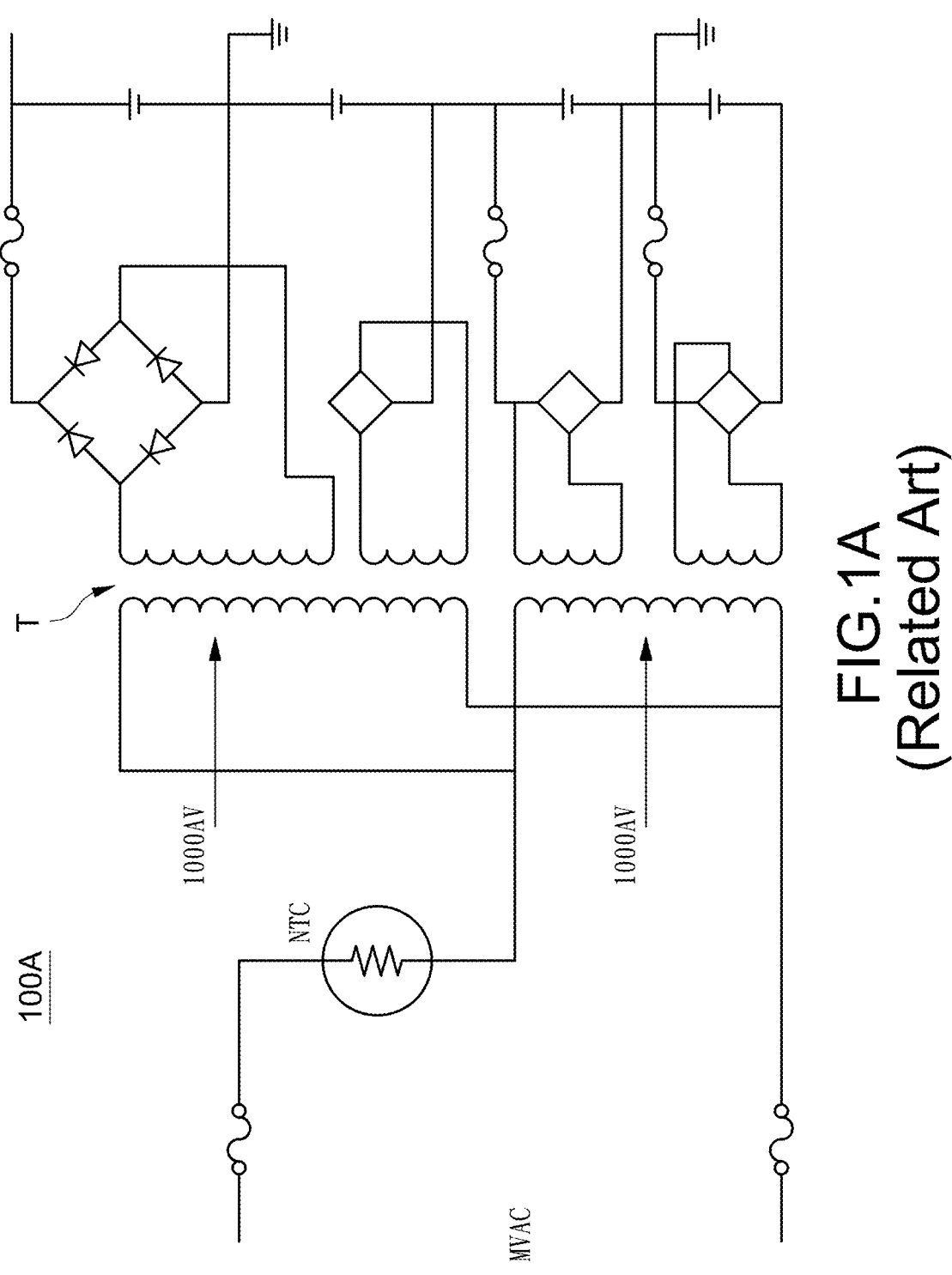
FIG. 1A is a block diagram of a related-art medium-voltage alternative-current (MVAC) power supply system.

Reference will now be made to the drawing figures to describe the present disclosure in detail. It will be understood that the drawing figures and exemplified embodiments of present disclosure are not limited to the details thereof. Please refer to FIG. 2A, which shows a block diagram of a medium-voltage alternative-current (MVAC) power supply system according to the present disclosure, and also refer to FIG. 1A and FIG. 1B. The MVAC power supply system 100 receives an MVAC power, and the MVAC power supply system 100 includes a first circuit breaker 2 and a plurality of MVAC conversion circuits 4. Specifically, when a MVAC is coupled to the MVAC power supply system 100, the MVAC power supply system 100 receives an input voltage Vac (AC voltage) provided by the MVAC, and the MVAC correspondingly provides an input current Iac to the MVAC power supply system 100 according to a demand (i.e., a load demand) of the MVAC power supply system 100. The MVAC conversion circuits 4 receive the MVAC (i.e., the input voltage Vac and the input current Iac) through the first circuit breaker 2 connected to the MVAC. In one embodiment, the first circuit breaker 2 is a voltage circuit breaker (VCB) or a disconnect switch (DS). Each MVAC conversion circuit 4 includes a medium-voltage switch MVS and a MV converter 42. The MVAC conversion circuit 4 is coupled to the first circuit breaker 2 through the medium-voltage switch MVS to receive the MVAC. Therefore, in the application of multiple MVAC conversion circuits 4, the first circuit breaker 2 can be shared.

When one of the MVAC conversion circuits 4 fails, the MVAC power supply system 100 can disconnect (turn off) the individual medium-voltage switch MVS so that a high impedance is formed between the faulty MV converter 42 and the power supplier of providing the MVAC (for example, but not limited to, a power grid), and there is no need to trip the first circuit breaker 2 in the front stage, thereby making the MVAC power supply system 100 more robust. Moreover, the MV converter 42 may be, for example, but not limited to, an AC-to-DC converter or an AC-to-AC converter to convert the MVAC into a low-voltage AC LVAC or a low-voltage DC LVDC, and provide the low-voltage AC LVAC or the low-voltage DC LVDC to the load 200 coupled to the rear end to supply power to the load 200. Preferably, since the medium-voltage switch MVS has an overcurrent protection function, the front-stage voltage circuit breaker VCB can be replaced with a low-cost medium-voltage disconnect switch DS.

Figure 2A:
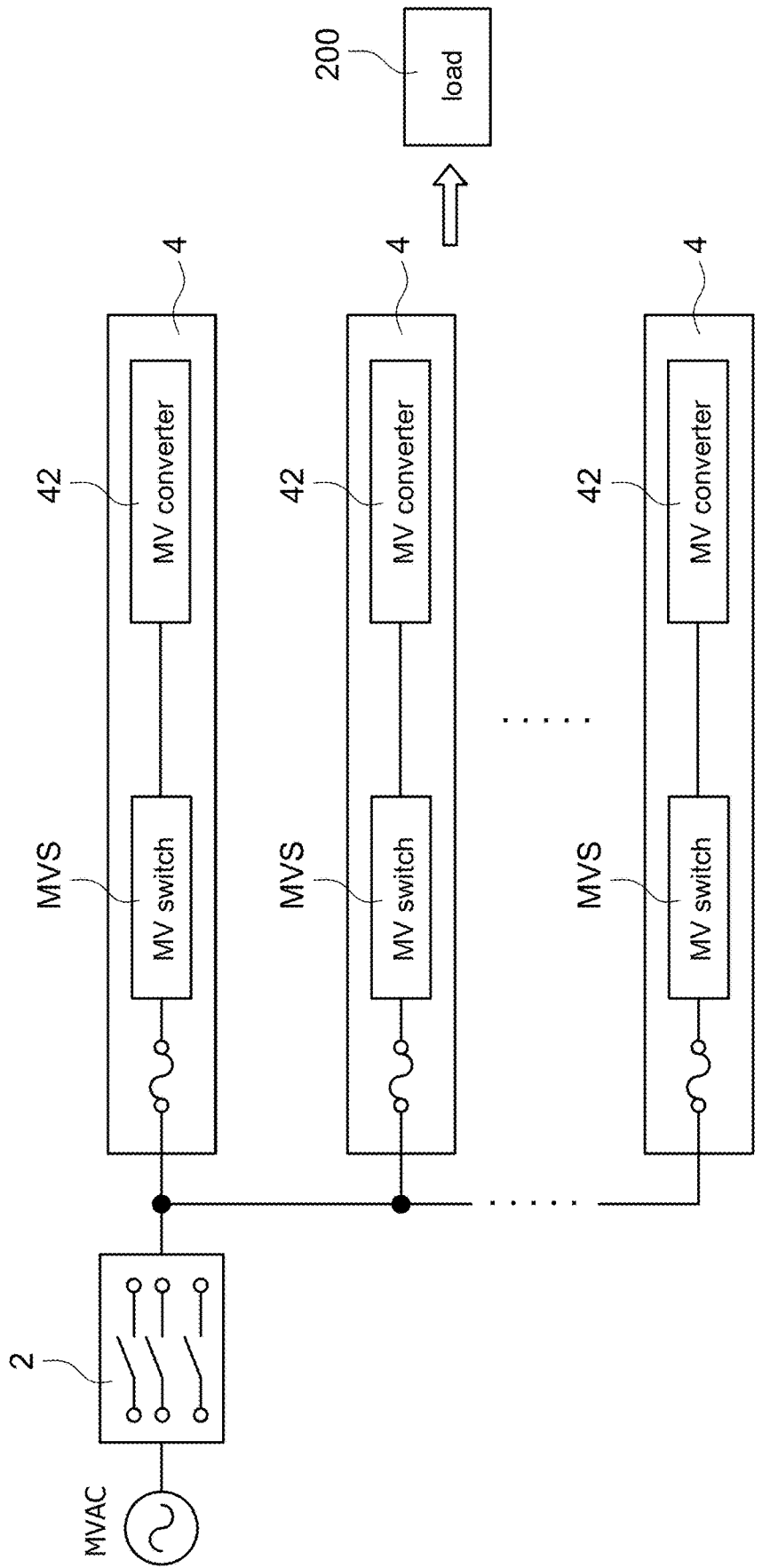
FIG. 2A is a block diagram of a medium-voltage alternative-current (MVAC) power supply system according to the present disclosure.
Figure 2B:
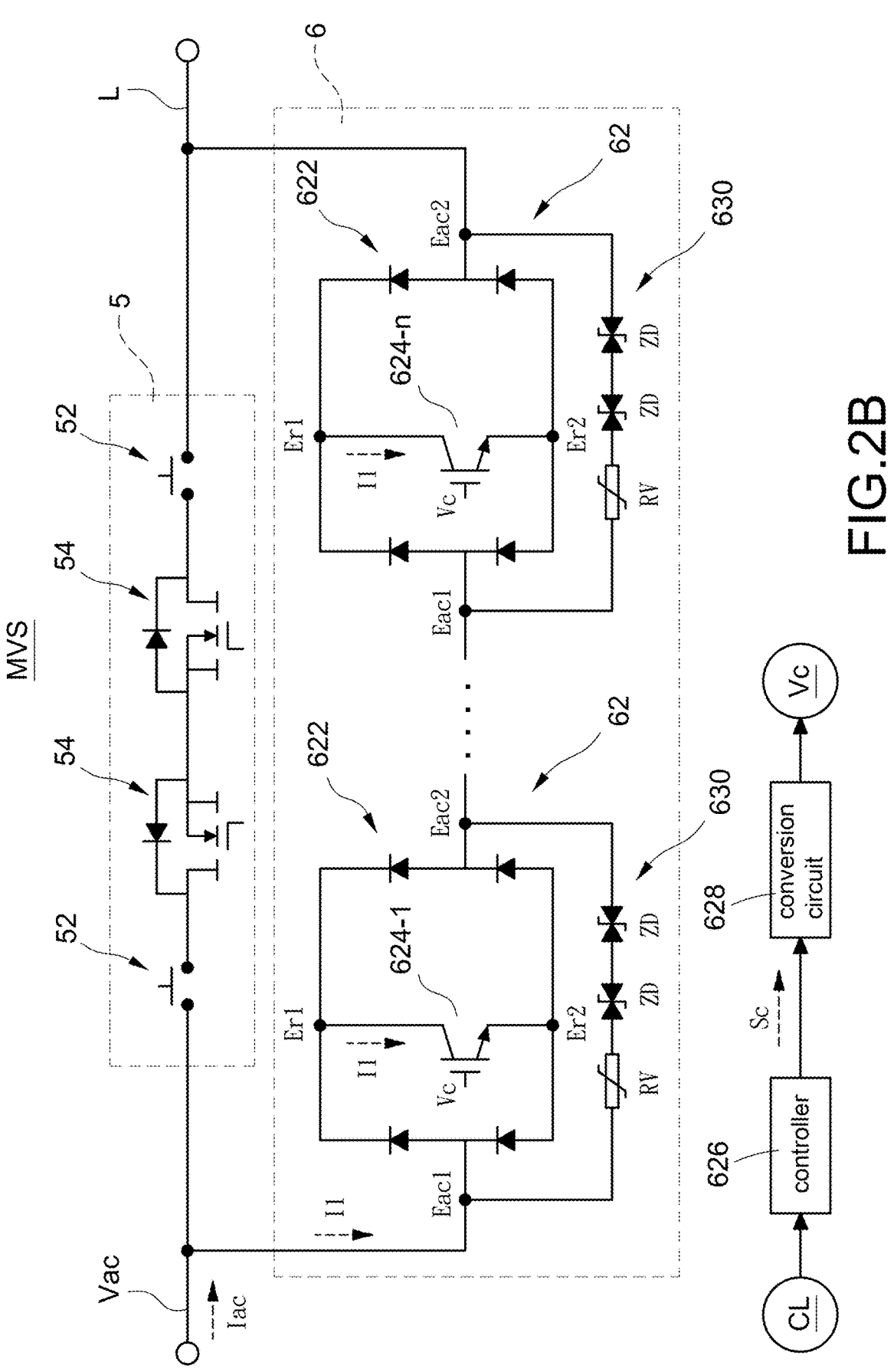
FIG. 2B is a block circuit diagram of a MV switch according to the present disclosure.

Please refer to FIG. 2B, which shows a block circuit diagram of a MV switch according to the present disclosure, and also refer to FIG. 2A. The medium-voltage switch MVS includes a second circuit breaker 5 and a surge suppressor 6, and the second circuit breaker 5 is coupled to an input path L of the MVAC conversion circuit 4. In particular, one terminal of the input path Lis coupled to the first circuit breaker 2, and the other terminal thereof is coupled to the MV converter 42. When the second circuit breaker 5 controls the input path L to be short-circuited, the MVAC is provided to the MV converter 42 through the input path L. When the second circuit breaker 5 controls the input path L to be open-circuited, the MVAC cannot be provided to the MV converter 42 through the input path L. As shown in FIG. 2B, the second circuit breaker 5 includes a set of mechanical switches 52 and a set of semiconductor switches 54, for example, but not limited to, two semiconductor switches 54 are used. The two semiconductor switches 54 can preferably be in a back-to-back connection structure, that is, the two semiconductor switches 54 are connected in reverse series (i.e., the direction of the junction diodes is opposite) so that a bidirectional disconnection can be achieved by turning off the two semiconductor switches 54, and further the number of the semiconductor switches 54 connected in series may be increased according to the withstand voltage of each semiconductor switch 54 when it is turned off can ensure that it is within the component specification. In particular, the two semiconductor switches 54 may be, for example, but not limited to, semiconductor components such as an insulated gate bipolar transistor (IGBT) or a metal-oxide semi-field effect transistor (MOSFET). The two mechanical switches 52 may preferably be arranged outside the two semiconductor switches 54 respectively so as to form a structure in which the mechanical switch 52 is outside and the semiconductor switch 54 is inside. Therefore, a structure can be achieved in which each MVAC conversion circuit 4 passes through a set of mechanical switches 52 and a set of semiconductor switches 54 to meet the insulation withstand voltage requirements of the MVAC.

Figure 1B:
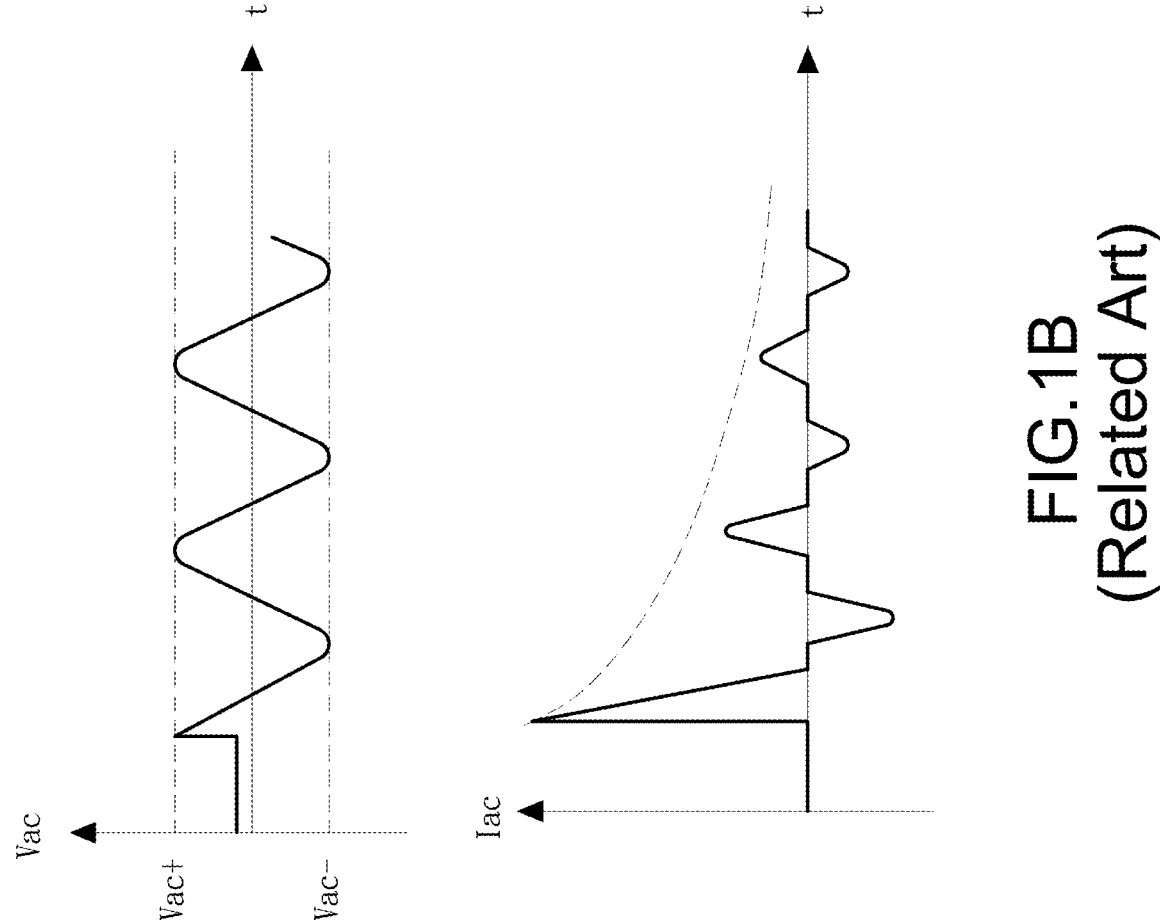
FIG. 1B is schematic waveform diagrams of an input voltage and an input current of the related-art MVAC power supply system.

The surge suppressor 6 is coupled in parallel to the second circuit breaker 5, and the surge suppressor 6 is mainly used to reduce the peak value of the surge when the input current Iac generates an excessive surge due to transient effects, thereby preventing the components inside the MVAC power supply system 100 from being broken down and damaged, or from accidentally touching the upper limit of the protection value of the second circuit breaker 5. Specifically, the rear end of the medium-voltage switch MVS is usually coupled to magnetic components such as transformers or inductors. When the magnetic flux of the magnetic component changes instantaneously (for example, but not limited to, the input source changes, the load instantaneously changes too much, etc., especially at the moment of starting and stopping of the MVAC power supply system 100), the input current Iac produces a high surge, and its peak value may even be several times higher than the rated current. Therefore, if excessive surges are not suppressed, the components inside the MVAC power supply system 100 may be broken down and damaged, or the upper limit of the protection value of the second circuit breaker 5 may be accidentally triggered to cause the second circuit breaker 5 to trip. Therefore, when the input current Iac generates a high surge, it can be suppressed by the surge suppressor 6 to avoid the above situation. In one embodiment, the MV converter 42 of the present disclosure may be a solid state transformer (SST), and the medium-voltage switch MVS may be arranged in the front stage of the solid state transformer. However, the MV converter 42 may also be a traditional medium-voltage transformer as shown in FIG. 1A, and therefore the circuit structure of the MV converter 42 is not limited.

The surge suppressor 6 includes a plurality of surge suppression circuits 62. The surge suppression circuits 62 are coupled in series to share the high input voltage Vac of the MVAC. Therefore, the number of surge suppression circuits 62 connected in series may be increased or decreased according to the voltage of the input voltage Vac, which is mainly determined by withstand voltage specifications of the surge suppression circuits 62 and the voltage of the input voltage Vac. Moreover, Since the second circuit breaker 5 includes two mechanical switches 52 and provides sufficient insulation withstand voltage distance, there is no need to connect in series like the multiple surge suppression circuits 62 of the surge suppressor 6. Each surge suppression circuit 62 includes a rectification circuit 622, a switch 624 (refer to any one of 624-1 to 624-n in FIG. 2B), a controller 626, and a conversion circuit 628. Also, each surge suppression circuit 62 further optionally includes a protection circuit 630. The rectification circuit 622 includes AC terminals Eac1, Eac2 and rectification terminals Er1, Er2, and the surge suppression circuits 62 are coupled in series through AC terminals Eac1, Eac2. For convenience of explanation, in FIG. 2B, the controller 626 and the conversion circuit 628 are illustrated as a single. However, it is not excluded that each surge suppression circuit 62 may include one controller 626 and one conversion circuit 628 to independently control the switch 624 of each surge suppression circuit 62. The switch 624 is coupled to the rectifier terminals Er1, Er2, and the switch 624 may be, for example, but not limited to, an insulated gate bipolar transistor (IGBT, hereinafter referred to as IGBT) or a metal-oxide semi-field effect transistor (MOSFET, hereinafter referred to as MOSFET).

In particular, since IGBTs are suitable for conduction and control of medium to high currents, and IGBTs can operate well at kilohertz frequencies, it is a better implementation to use IGBTs for switch 624. In addition, the rectification circuit 622 may be, for example, but not limited to, a half-bridge circuit or a full-bridge circuit, and using a full-bridge circuit is a preferred implementation. Therefore, when the input current Iac is positive, the first current I1 assigned to this path of the surge suppressor 6 will flow from the AC terminal Eac1 to the AC terminal Eac2, and will flow from the rectifier terminal Er1 to the rectifier terminal Er2 due to the turned switch 624. On the contrary, when the input current Iac is negative, the first current I1 will flow from the AC terminal Eac2 to the AC terminal Eac1, but the direction of flowing through the rectifier terminals Er1, Er2 remains unchanged. Therefore, through the rectification (commutation) of the rectification circuit 622, the current direction when the first current I1 flows through the switch 624 may be a fixed direction.

The conversion circuit 628 is coupled to the controller 626 and a control terminal of the switch 624 so that the controller 626 can operate the switch 624 by controlling the conversion circuit 628. Specifically, the controller 626 receives a control command CL and provides a control signal Sc according to the control command CL. In particular, the control command CL may be provided by a system controller (not shown) of the MVAC power supply system 100 or by a controller (not shown) inside the MVAC conversion circuit 4, and is not limited here. The control signal Sc may preferably be a pulse width modulation (PWM) signal, and the conversion circuit 628 receives the control signal Sc to provide a control voltage Vc modulated by the control signal Sc according to the control signal Sc. Due to the control method of the IGBT (or MOSFET), the channel size of the IGBT (or MOSFET) can be changed mainly by adjusting the control voltage Vc, and then an on-resistance R of the switch 624 (i.e., an Rce_on of the IGBT or an Rds_on of the MOSFET) is adjusted so that the magnitude of the first current I1 flowing through the switch 624 is limited. For the convenience of explanation, IGBT will be used as the main explanation as follows. In particular, the above operation mainly uses the working area of the switch 624 to control the conduction degree of the switch 624, and therefore the rectification circuit 622 only needs to be matched with a single switch 624 (or several, depending on its voltage and current resistance specifications) to form the surge suppression circuit 62.

Therefore, the main purpose and effect of the present disclosure is that the MVAC power supply system 100 can adjust the magnitude of the first current I1 flowing through the switch 624 by adjusting the on-resistance R of each surge suppression circuit 62, thereby suppressing the surge of the input current Iac caused by transient effects. Moreover, since the surge suppressor circuit 62 of the present disclosure does not include an additional (parallel) path formed by a resistor (that is, there is only a single path formed by the switch 624 on the path of the surge suppressor 6), when the switch 624 is turned off, the first current I1 will not flow through the resistor on the additional path and the surge suppression circuit 62 will not cause extra power consumption, or there will be no increase in the internal ambient temperature of the medium-voltage switch MVS due to resistance consumption. Therefore, the surge suppressor 6 of the present disclosure can completely isolate the voltage across the switch 624 and easily detect whether the switch 624 is damaged, for example, but not limited to, when the control signal Sc is output, a single current sensor detects whether there is current flowing through the switch 624 to determine whether the switch 624 is damaged.

Furthermore, due to the instantaneous change of the magnetic flux of the magnetic element, it usually occurs during the starting and stopping of the MVAC conversion circuit 4, however, it does not exclude any time period when the MVAC conversion circuit 4 is operating. Therefore, during the starting and stopping period, the surge suppression circuit 62 is enabled (for example, but not limited to, by any device inside the MVAC power supply system 100, and preferably may be performed by the system controller of the MVAC power supply system 100) so as to limit the input current Iac within a predetermined range (for example, but not limited to, limiting the surge to within 2 times the rated current), thereby preventing the components inside the MVAC power supply system 100 from being broken down and damaged, or from accidentally triggering the upper limit of the protection value of the second circuit breaker 5. On the contrary, at the end of the starting and stopping period, the surge suppression circuit 62 is disabled (for example, but not limited to, the controller 626 stops providing the control signal Sc, or disconnects a connection between the conversion circuit 628 and the switch 624 through an internal switch (not shown)) to prevent the surge suppression circuit 62 from continuously consuming power. In addition, during the operation of the MVAC power supply system 100, if it is necessary to use the surge suppression circuit 62 to suppress the surge of the input current Iac, the surge suppression circuit 62 may also be selectively enabled.

Furthermore, when the MVAC is connected to the MVAC power supply system 100 and the MVAC conversion circuit 4 enters the starting and stopping period, the MVAC power supply system 100 first enables the surge suppression circuit 62, and the controller 626 adjusts the on-resistance R of the surge suppression circuit 62 to suppress the surge of the input current Iac. In this condition, the second circuit breaker 5 has not yet connected to the input path L, thereby causing the input path L to be open-circuited. Afterward, the MVAC power supply system 100 first turns on the two mechanical switches 52 and then turns on the two semiconductor switches 54 to avoid the occurrence of arcs caused by the large current flowing during the moment when the two mechanical switches 52 are turned on. Finally, after the input path L is connected, each surge suppression circuit 62 is disabled to prevent the surge suppression circuit 62 from continuously consuming power. On the contrary, when the MVAC power supply system 100 is shut down and the MVAC conversion circuit 4 enters the starting and stopping period, the MVAC power supply system 100 first enables the surge suppression circuit 62, and uses the controller 626 to adjust the on-resistance R of the surge suppression circuit 62 to suppress the surge of the input current Iac. In this condition, the second circuit breaker 5 has not yet disconnected to the input path L, thereby causing the input path L to be short-circuited. Afterward, the MVAC power supply system 100 first turns off the two semiconductor switches 54 and then turns off the two mechanical switches 52 to avoid arcs caused by the large current flowing at the moment when the two mechanical switches 52 are turned off. Finally, after the input path L is disconnected, each surge suppression circuit 62 is disabled or does not work so as to shut down the MVAC power supply system 100. In particular, the adjustment manner of the on-resistance R will be further explained later and will not be described again here.

Please refer to FIG. 2B again, the protection circuit 630 is connected in parallel to the AC terminals Eac1, Eac2 and is used to provide an overvoltage protection to the surge suppression circuit 62. Furthermore, since the MVAC is connected to the MVAC power supply system 100, each surge suppression circuit 62 needs to withstand the high input voltage Vac. When the input voltage Vac is too high due to certain factors (such as but not limited to voltage distortion, overvoltage, etc.) under the second circuit breaker 5 and the surge suppressor 6 being open-circuited, the protection circuit 630 can limit the voltage of the AC terminals Eac1, Eac2 to be less than or equal to a predetermined voltage to prevent the voltage from exceeding the withstand voltage specification of the surge suppression circuit 62 to damage the surge suppression circuit 62. In particular, the protection circuit 630 preferably includes a variable resistor Rv and at least one clamping circuit ZD. The variable resistor Rv is mainly used to limit the current flowing through this path to avoid overcurrent. The clamping circuit ZD mainly clamps the voltage at the AC terminals Eac1, Eac2 at a specific voltage to prevent the voltage at the AC terminals Eac1, Eac2 from being too high. In particular, the clamping circuit ZD may be, for example, but not limited to, a Zener diode, and the number of the clamping circuits ZD is mainly designed based on the withstand voltage specifications of the surge suppression circuit 62. Specifically, the number of the clamping circuits ZD may be selectively connected in series from one to several clamping circuits ZD according to the withstand voltage specification of the surge suppression circuit 62 to limit the voltages at AC terminals Eac1, Eac2 to be lower than their withstand voltage specifications.

Figure 3:
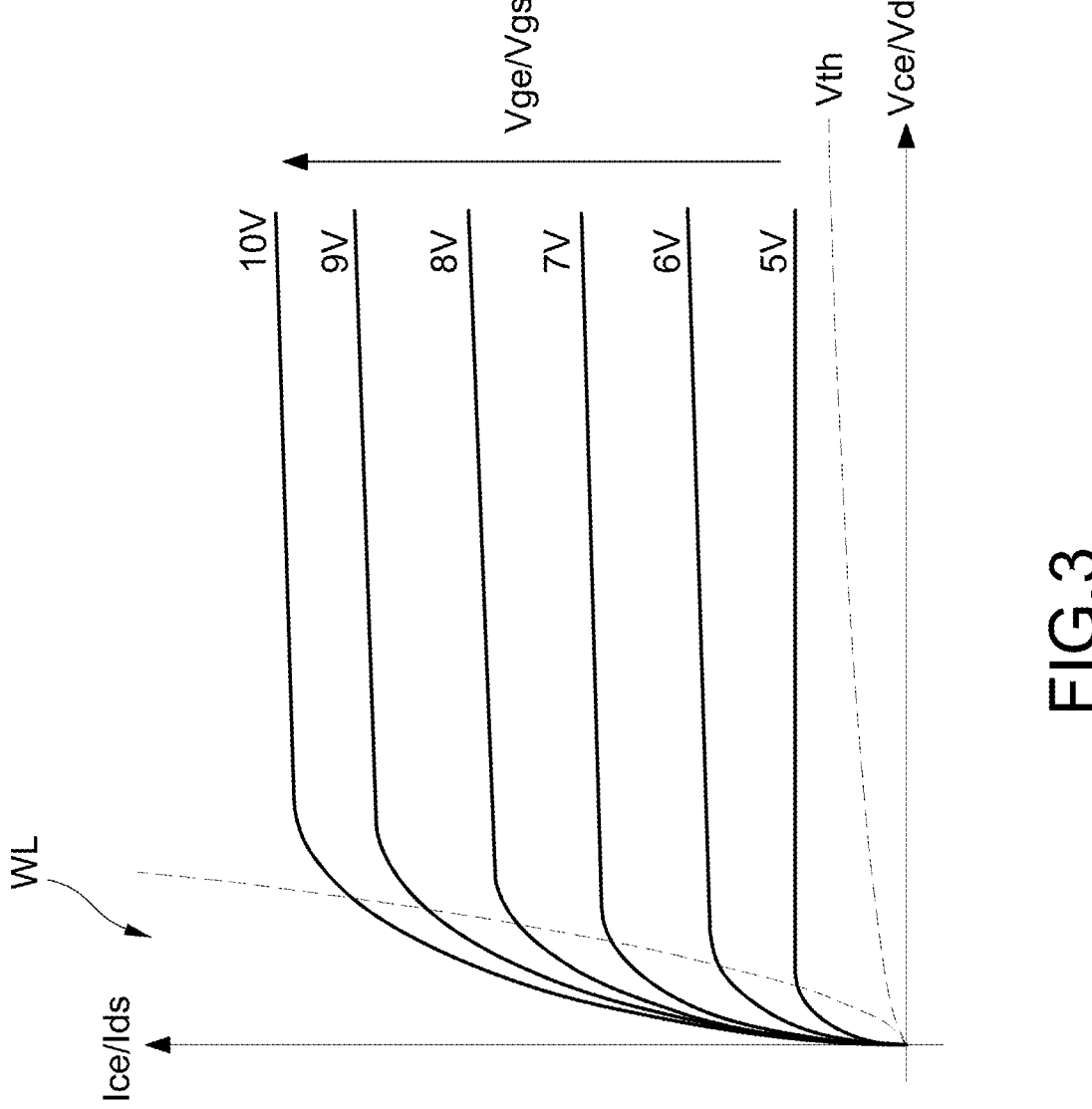
FIG. 3 is a schematic waveform diagram of a work zone of a switch according to the present disclosure.

Please refer to FIG. 3, which shows a schematic waveform diagram of a work zone of a switch according to the present disclosure, and also refer to FIG. 2A and FIG. 2B. Taking the switch 624 as an IGBT as an example, the horizontal axis is a voltage difference Vce from an input terminal C to an output terminal E of the IGBT; the vertical axis is a current Ice flowing from the input terminal C to the output terminal E of the IGBT. Each curve represents the relationship between the voltage difference Vce between the input terminal C and the output terminal E and the current Ice when different voltages are applied to the control terminal G of the IGBT. In particular, the symbols of the input terminal C and the output terminal E are mainly labeled according to the actual polarity of the IGBT (such as a collector C, an emitter E). However, its labeling can be changed according to the direction of the current, the forward/reverse connection of the switch, or the type of switch (for example, the collector C is the output terminal and the emitter E is the input terminal).

When the voltage of the control terminal G of the IGBT is lower than a threshold (that is, the control terminal voltage Vge is lower than the critical voltage Vth), the switch 624 does not establish a channel so that the input terminal C and the output terminal E of the switch 624 are open-circuited and no current can flow (Ice equals 0). When the voltage of the control terminal G of the switch 624 gradually increases (that is, Vge gradually increases to exceed the critical voltage Vth), a channel begins to be established between the input terminal C and the output terminal E of the switch 624, and the channel gradually becomes larger (that is, Vge gradually increases from 5V to 10V) so that the current Ice flowing through the input terminal C and the output terminal E gradually increases. When the channel begins to be established between the input terminal C and the output terminal E, the on-resistance R (Rce_on at both terminals of the switch 624 gradually decreases as the channel gradually becomes larger. Therefore, it can be regarded as a controlled variable resistor.

When the on-resistance R of the switch 624 gradually decreases, the current Ice that can flow through the switch 624 gradually increases; on the contrary, the current Ice that can flow through the switch 624 gradually decreases. Therefore, when the surge suppression circuit 62 is enabled, the controller 626 can adjust the on-resistance R of the switch 624 by adjusting the control voltage Vc to limit the first current I1 flowing through the input terminal C and the output terminal E of the switch 624, thereby reducing the surge peak value of the input current Iac. Since the surge characteristic of the input current Iac is that the first surge is generally the highest value when a surge occurs (for example, but not limited to, 10 times the rated current) and most of the subsequent surges return to a stable value (such as but not limited to, rated current) after exponential decay, when the starting and stopping period is about to end, the switch 624 can be fully turned on (that is, the duty cycle of the control signal is set to 100%, or the frequency of the control signal is adjusted to 0, etc.) so that when the current Ice flows through the switch 624, the lower on-resistance R can save the power loss of the surge suppressor 6. Therefore, the present disclosure mainly operates the switch 624 (i.e., the IGBT) in the linear region WL to use it as a controlled variable resistor, and adjusts its channel size and on-resistance R by adjusting its control terminal voltage Vge.

For the convenience of explanation, the adjustment of the duty cycle will be used as a schematic example as follows, and the adjustment of the frequency can be deduced from the adjustment manner of the duty cycle and will not be described in detail. In particular, if the switch 624 uses a MOSFET, the horizontal axis is the voltage difference Vds from the input terminal D to the output terminal S of the MOSFET, and the vertical axis is the current Ids flowing from the input terminal D of the MOSFET to the output terminal S. Each curve represents the relationship between the voltage difference Vds between the input terminal D and the output terminal S and the current Ids when different voltages are applied to the control terminal G of the MOSFET. The effect and control method are also to use the voltage of the control terminal G (i.e., Vgs) to control the current Ids that can flow through the input terminal D and the output terminal S. Therefore, the switch 624 of the MOSFET is also operated in the linear region WL to serve as a controlled variable resistor, and its channel size and on-resistance R are adjusted by adjusting its control terminal voltage Vgs.

Figure 4A:
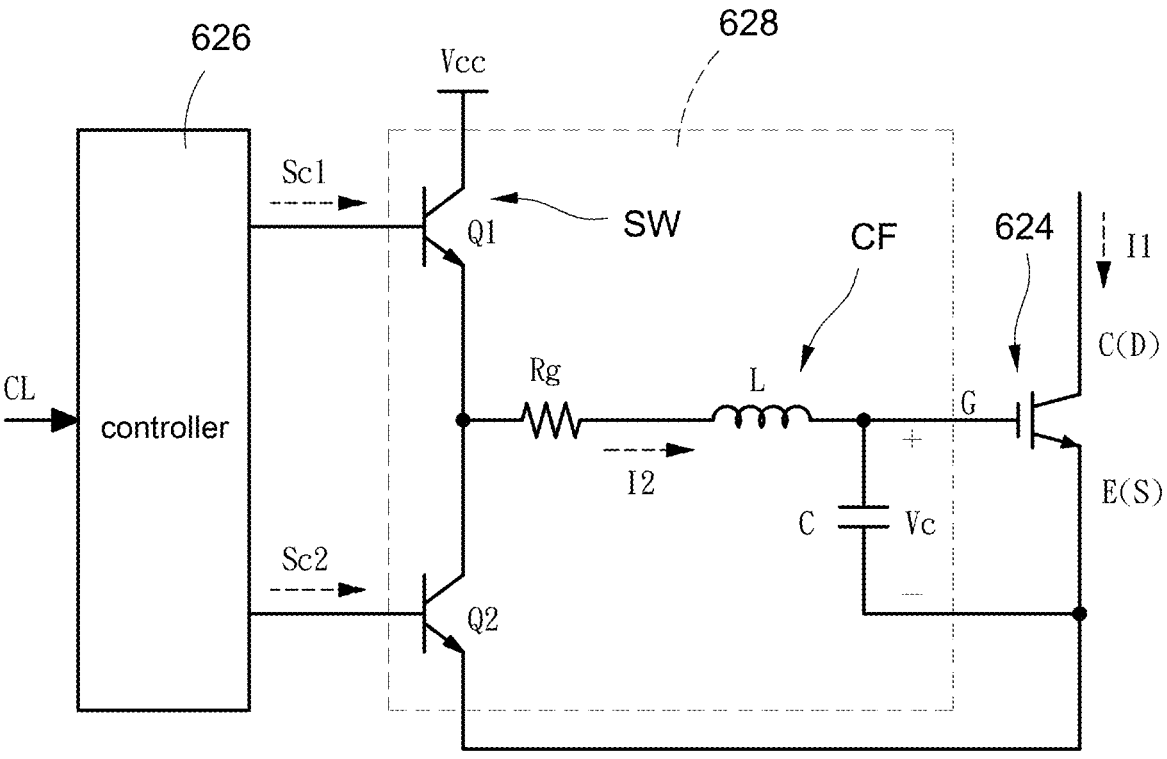
FIG. 4A is a block circuit diagram of a conversion circuit according to a first embodiment of the present disclosure.

Please refer to FIG. 4A, which shows a block circuit diagram of a conversion circuit according to a first embodiment of the present disclosure, and also refer to FIG. 2A to FIG. 3. In FIG. 4A, the controller 626 receives the control command CL and provides control signals Sc1, Sc2 to the conversion circuit 628 according to the control command CL. The conversion circuit 628 is coupled to the controller 626 and the switch 624, and provides the control voltage Vc to the switch 624 according to the control signals Sc1, Sc2. Specifically, the conversion circuit 628 receives the control signals Sc1, Sc2, and converts a working voltage Vcc into the control voltage Vc according to the control signals Sc1, Sc2 and provides the control voltage Vc to the switch 624. The switch 624 is coupled to the rectification terminals Er1, Er2 of the rectification circuit 622, and receives the control voltage Vc through the control terminal G to adjust the channel of the switch 624 and its corresponding on-resistance R to adjust the first current I1 that can flow through this channel. In particular, the working voltage Vcc can be provided by converting the input voltage Vac or provided by an external electronic device, and it is not limited to this here.

Moreover, the control command CL may be an analog signal provided by an analog controller or a digital signal provided by a digital controller. Since the surge characteristic of the input current Iac is that the first surge is generally the highest value when a surge occurs and most of the subsequent surges return to a stable value after exponential decay, the controller 626 can gradually increase the duty cycles of the control signals Sc1, Sc2 according to the control command CL to perform corresponding control corresponding to the size of the surge. Based on the above, as the duty cycles of the control signals Sc1, Sc2 gradually increase, the voltage value of the control voltage Vc outputted by the conversion circuit 628 also gradually increases. Therefore, the channel of the switch 624 can be gradually enlarged, and the on-resistance R is gradually decreased so that the first current I1 that can flow increases.

If the operation is performed by adjusting the duty cycle, the preferred operation manner is to increase the duty cycle at an equal rate so that the voltage value of the control voltage Vc also increases at the equal rate. For example, but not limited to, the duty cycle of the control signals Sc1, Sc2 increases at a rate of 1%, but is not limited to this. Therefore, a better surge current suppression effect can be achieved without causing the switch 624 to turn on too slowly and having to extend the starting and stopping period, or the switch 624 to turn on too fast to effectively suppress the surge of the input current Iac. Therefore, the present disclosure utilizes the operating characteristics of the switch 624 as a semiconductor switch so that the controller 626 only needs to control the duty cycle of the control signals Sc1, Sc2 to control the current flowing through the switch 624.

Specifically, the conversion circuit 628 includes a switching circuit SW and a filtering circuit CF, and the controller 626, the switching circuit 628, and the filtering circuit CF constitute a switching converter. The switching circuit SW is coupled to the controller 626, and the filtering circuit CF is coupled to the switching circuit SW and the switch 624. The switching circuit SW is switched on according to the control signals Sc1, Sc2, and the filtering circuit CF generates the control voltage Vc according to the switching on of the switching circuit SW. The switching circuit SW includes an upper-bridge switch Q1 and a lower-bridge switch Q2. The upper-bridge switch Q1 receives the working voltage Vcc, and is coupled to the controller 626 and the filtering circuit CF. The lower-bridge switch Q2 is coupled to the upper-bridge switch Q1, the controller 626, and the output terminal E of the switch 624.

The filtering circuit CF includes an inductor L and a capacitor C. One terminal of the inductor L is coupled to a node between the upper-bridge switch Q1 and the lower-bridge switch Q2, and the other terminal of the inductor L is coupled to one terminal of the capacitor C and the control terminal G of the switch 624. The other terminal of the capacitor C is coupled to the output terminal E of the switch 624 to establish the control voltage Vc between the control terminal G and the output terminal E of the switch 624 that can adjust the on-resistance R (channel size) of the switch 624. In one embodiment, the controller 626, the switching circuit SW, and the filtering circuit CF may form a buck converter, but its structure can also use switching converters such as, but not limited to, a boost converter. Therefore, if the conversion circuit 628 is a switching converter, the difference is only in the circuit cost of the circuit structure and the difficulty of the control manner, but both can generate the control voltage Vc by controlling the switching circuit SW. In particular, the buck converter is preferred since it has a simple circuit structure, low cost, and the simplest control manner.

In particular, the above switching conduction refers to the continuous on/off of the upper-bridge switch Q1 and the lower-bridge switch Q2 respectively controlled by the control signals Sc1, Sc2. Specifically, the upper-bridge switch Q1 and the lower-bridge switch Q2 receive an upper-bridge control signal Sc1 and a lower-bridge control signal Sc2 respectively, and the upper-bridge control signal Sc1 and the lower-bridge control signal Sc2 are complementary control signals. When the upper-bridge control signal Sc1 controls the upper-bridge switch Q1 to be turned on, the lower-bridge control signal Sc2 controls the lower-bridge switch Q2 to be turned off. In this condition, the working voltage Vcc charges the filtering circuit CF through the upper-bridge switch Q1. Taking FIG. 4A as an example, the working voltage Vcc stores energy in the inductor L so that the second current I2 generated by the inductor L charges the capacitor C. Therefore, the voltage value of the control voltage Vc across the capacitor C begins to increase. Afterward, the upper-bridge control signal Sc1 controls the upper-bridge switch Q1 to be turned off and the lower-bridge control signal Sc2 controls the lower-bridge switch Q2 to be turned on. In this condition, the filtering circuit CF releases energy through the lower-bridge switch Q2. Taking FIG. 4A as an example, the inductor L, the capacitor C, and the low-bridge switch Q2 form a closed loop, and the second current I2 of the inductor L releases energy to the capacitor C. In particular, the conversion circuit 628 is not a general switching conversion circuit that adjusts the duty cycle to maintain the control voltage Vc across the capacitor C at a constant DC voltage, but adjusts the on-resistance R in order to suppress the surge of the input current Iac. Therefore, the control voltage Vc is not a constant value during the adjustment process of the on-resistance R. Moreover, according to the surge characteristic of the input current Iac, the duty cycles of the control signals Sc1, Sc2 can be gradually increased to increase the control voltage Vc and decrease the on-resistance R accordingly. Finally, when the duty cycle is the maximum (ideally 100%, in practice it is mainly based on the limit of the controller 626), the control voltage Vc is a constant value so that the channel of the switch 624 is enlarged to the maximum, and the on-resistance R is decreased to the minimum (that is, entering the saturation region, and the switch 624 is in a fully turned-on state.

Please refer to FIG. 4A again. The conversion circuit 628 further includes a current-limiting resistor Rg, and the current-limiting resistor Rg is coupled between the upper-bridge switch Q1, the lower-bridge switch Q2, and the filtering circuit CF. Since the filtering circuit CF has not yet retained any energy when the conversion circuit 628 is not working, when the conversion circuit 628 starts to operate and the upper bridge switch Q1 is turned on, a large current will instantaneously flow to the filter circuit CF. As shown in FIG. 4A for example, when the conversion circuit 628 is not working, the capacitor C does not have any voltage yet and is close to be short-circuited, and therefore when the conversion circuit 628 starts to operate and the upper-bridge switch Q1 is turned on, a large current will instantaneously flow to the capacitor C. Therefore, the voltage value of the control voltage Vc will be too high instantaneously to cause the switch 624 to be mistakenly turned on, and the surge of the input current Iac cannot be effectively suppressed. Therefore, the current-limiting resistor Rg can limit the current flowing from the working voltage Vcc through the upper-bridge switch Q1 to the filtering circuit CF when the upper-bridge switch Q1 is turned on, thereby preventing the switch 624 from malfunctioning and providing an excessively large channel, and further protecting the upper-bridge switch Q1 from being damaged due to the large current. In particular, the current-limiting resistor Rg may also be called a driving resistor.

Figure 4B:
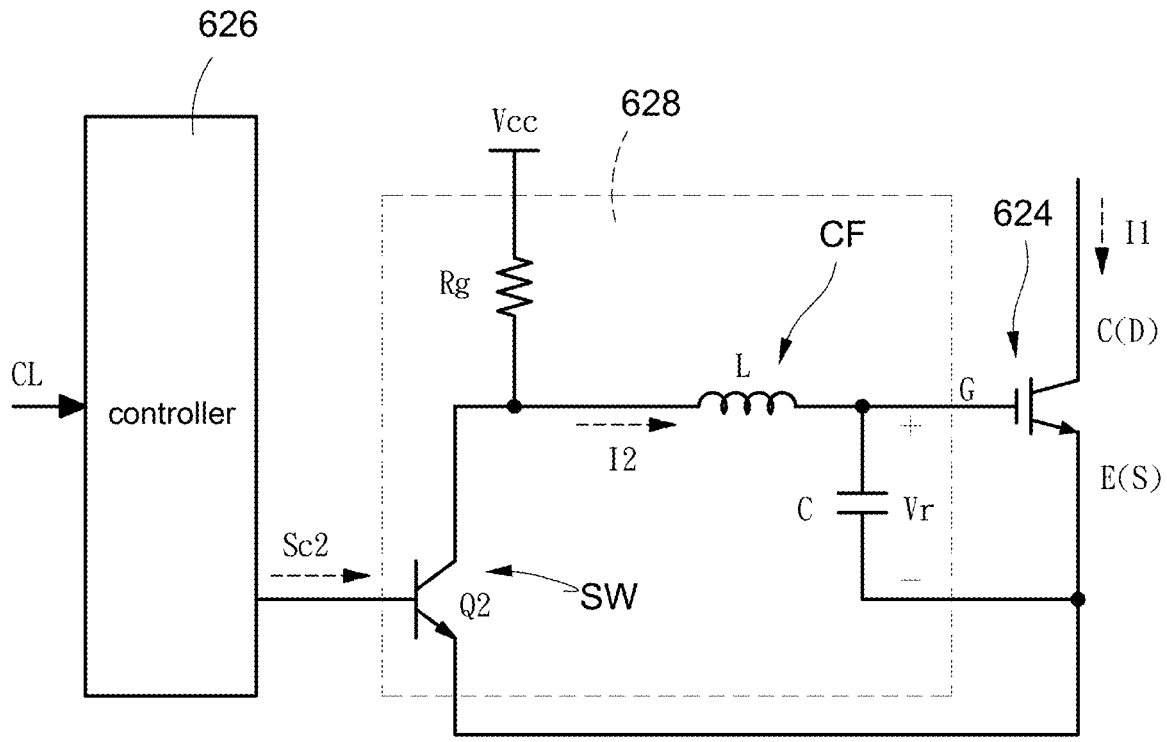
FIG. 4B is a block circuit diagram of the conversion circuit according to a second embodiment of the present disclosure.

Please refer to FIG. 4B, which shows a block circuit diagram of the conversion circuit according to a second embodiment of the present disclosure, and also refer to FIG. 1A to FIG. 4A. The difference between the first embodiment of FIG. 4A and the second embodiment of FIG. 4B is that the switching circuit SW only has the lower-bridge switch Q2, and the controller 626 only provides the lower-bridge control signal Sc2 to the lower-bridge switch Q2. The lower-bridge switch Q2 receives the working voltage Vcc and is coupled to the controller 626 and the filter circuit CF to receive the lower-bridge control signal Sc2 to be switched on. When the lower-bridge control signal Sc2 is at the first level (i.e., a low level), the lower-bridge switch Q2 is not turned on. In this condition, the working voltage Vcc charges the capacitor C through the filtering circuit CF. Taking FIG. 4B as an example, the working voltage Vcc stores energy in the inductor L so that the second current I2 generated by the inductor L charges the capacitor C. Therefore, the voltage value of the control voltage Vc across the capacitor C begins to increase. Afterward, when the low-bridge control signal Sc2 is at the second level (i.e., a high level), the low-bridge switch Q2 is turned on. In this condition, the filtering circuit CF releases energy through the low-bridge switch Q2. Taking FIG. 4B as an example, the inductor L, the capacitor C, and the low-bridge switch Q2 form a closed loop, and the second current I2 of the inductor L releases energy to the capacitor C. In particular, the circuit coupling manners and control manners not mentioned in FIG. 4B are the same as those in FIG. 4A and will not be described again.

Similarly, the conversion circuit 628 further includes a current-limiting resistor Rg, and the current-limiting resistor Rg receives the working voltage Vcc, and is coupled to the lower-bridge switch Q2 and the filtering circuit CF, and its function is equivalent to the current-limiting resistor Rg in FIG. 4A. In particular, the coupling position of the current-limiting resistor Rg in FIG. 4A may also be the same as the coupling position in FIG. 4B, that is, the current-limiting resistor Rg can achieve the same effect regardless of whether it is configured in the position of FIG. 4A or FIG. 4B. Optionally, after the starting and stopping period end, the controller 626 may also provide the low-bridge control signal Sc2 to normally turn on the low-bridge switch Q2 so as to consume all the remaining energy stored in the filtering circuit CF (especially the remaining energy in the capacitor C), thereby preventing the residual control voltage Vc from still controlling the switch 624 to mistakenly provide a channel and its corresponding on-resistance R. In particular, the current-limiting resistor Rg may also be called a driving resistor. In addition, the controller 626, the upper-bridge switch Q1, and the lower-bridge switch Q2 in FIG. 4A and FIG. 4B may actually be included in a driver IC.

Please refer to FIG. 5A, which shows a flowchart of a method of operating a surge suppressor according to the present disclosure, and also refer to FIG. 1A to FIG. 4B. The surge suppressor 6 is mainly applied to the MVAC of the MVAC power supply system 100, and the surge suppressor 6 is connected in parallel to the circuit breaker 5 of the input path L of the MVAC conversion circuit 4. The surge suppressor 6 includes a plurality of surge suppression circuits 62 coupled in series, and each surge suppression circuit 62 includes rectification terminals Er1, Er2 and a switch 624 coupled to the rectification terminals Er1, Er2. The surge suppressor circuit 62 is used to rectify the first current I1 flowing through the path of the surge suppressor 6 to provide a first current I1 in a fixed direction from the rectification terminal Er1 to the rectification terminal Er2. The method of controlling the surge suppressor 6 includes steps of: receiving a control command, and providing a control signal according to the control command (step S100). A preferred implementation is that the control command CL is received by the controller 626, and the controller 626 provides the control signal Sc according to the control command CL. In one embodiment, the control signal Sc may preferably be a pulse width modulation (PWM) signal.

Afterward, providing a control voltage modulated by the control signal (step S120). A preferred implementation is that the control signal Sc is received by the conversion circuit 628 to provide a control voltage Vc modulated by the control signal Sc according to the control signal Sc, and the control voltage Vc is not a constant value during the process of suppressing the surge of the input current Iac. Afterward, adjusting an on-resistance of the switch according to the control voltage (step S140). A preferred implementation is that the switch 624 is coupled to the conversion circuit 628 to provide a control voltage Vc to control a channel size of the switch 624 and its corresponding on-resistance R. Finally, adjusting a magnitude of a first current flowing through the switch by adjusting the on-resistance (step S160). Since the channel size of IGBT (or MOSFET) can be changed by adjusting the control voltage Vc so as to adjust the on-resistance R of switch 624 (i.e., Rce_on of IGBT or Rds_on of MOSFET), the channel size of the IGBT (or MOSFET) and its corresponding on-resistance R can be changed by adjusting the control voltage Vc to limit the magnitude of the first current I1 flowing through the switch 624.

Please refer to FIG. 5B, which shows a flowchart of operating the surge suppressor during a starting and stopping period according to the present disclosure, and also refer to FIG. 1A to FIG. 5A. Due to the instantaneous change of the magnetic flux of the magnetic components, it usually occurs during the starting and stopping period when the MVAC conversion circuit 4 is enabled or disabled (but it does not exclude any period when the MVAC conversion circuit 4 is operating). Therefore, applications during starting and stopping period further include a step of: setting a starting and stopping period of enabling or disabling the medium-voltage alternative-current (MVAC) conversion circuit (step S200). The MVAC power supply system 100 can set the starting and stopping period according to an enabled time or a disabled time of the MVAC conversion circuit 44, mainly based on the time of the second circuit breaker 5 of the medium-voltage switch MVS in FIG. 2B completely connecting the input path L or completely disconnecting the input path L.

Afterward, enabling the surge suppression circuits during the starting and stopping period, and operating each of the surge suppression circuits to perform step S100 to step S160 (step S220). During the starting and stopping period, the surge suppressor circuit 62 is enabled (for example, but not limited to, by any device inside the MVAC power supply system 100, and preferably may be performed by the system controller of the MVAC power supply system 100) so as to limit the input current Iac within a predetermined range (for example, but not limited to, limiting the surge to within 2 times the rated current), thereby preventing the components inside the MVAC power supply system 100 from being broken down and damaged, or from accidentally triggering the upper limit of the protection value of the second circuit breaker 5. Finally, disabling the surge suppression circuits when the starting and stopping period ends (step S240). At the end of the starting and stopping period, the surge suppression circuit 62 is disabled (for example, but not limited to, the controller 626 stops providing the control signal Sc, or disconnects the conversion circuit 628 and the switch 624 through an internal switch (not shown), etc.) to prevent the surge suppression circuit 62 from continuously consuming power. In particular, for detailed operation methods not illustrated in FIG. 5A and FIG. 5B, please refer to FIG. 2A to FIG. 4B and will not be described again here.

Figure 6A:
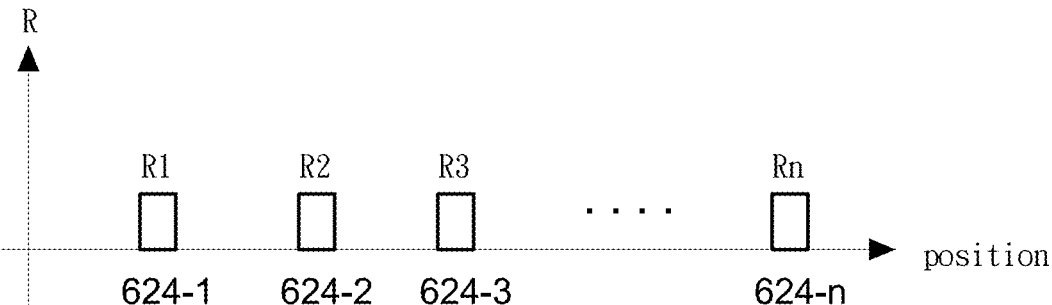
FIG. 6A is a schematic diagram of adjusting an on-resistance during the starting and stopping period according to a first embodiment of the present disclosure.
Figure 6C:
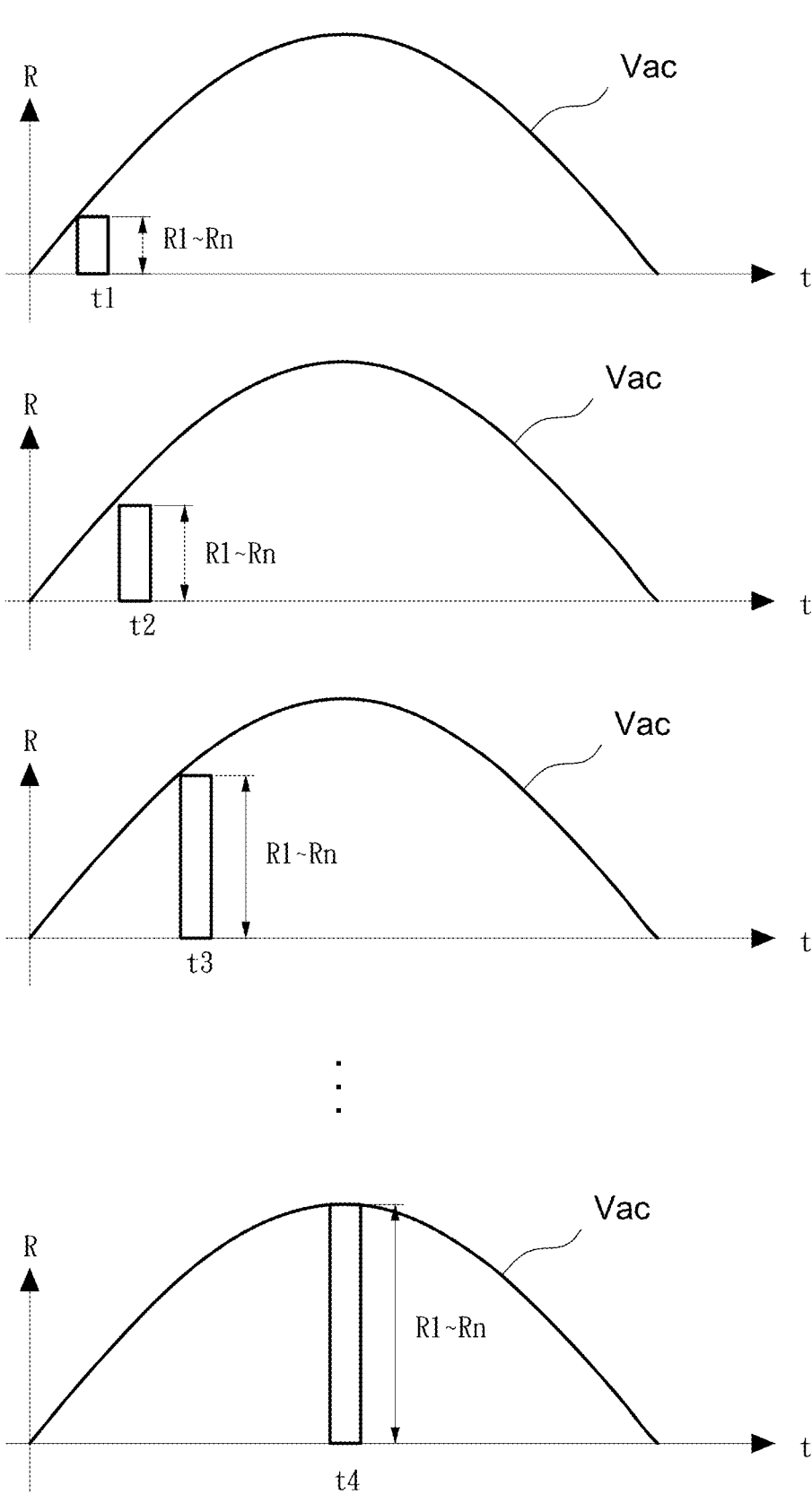
FIG. 6C is a schematic diagram of adjusting the on-resistance during the starting and stopping period according a third embodiment of the present disclosure.

Please refer to FIG. 6A to FIG. 6C, show schematic diagrams of adjusting an on-resistance during the starting and stopping period according three embodiments of the present disclosure respectively, and also refer to FIG. 1A to FIG. 5B. Since the on-resistances R1 to Rn of the switches 624-1 to 624-$n$ are controlled by the control voltage Vc and can be regarded as variable resistors, the above step S220 may include, for example, but not limited to, the inductance adjustment manners shown in FIG. 6A to FIG. 6C. In FIG. 6A, the most basic adjustment manner is shown, and the vertical axis is the resistance of the on-resistance Rn, and the horizontal axis is the actual configuration position of each switch 624-1 to 624-$n$. Each surge suppression circuit 62 provides substantially the same control voltage Vc so that the channels of the switches 624-1 to 624-$n$ are substantially the same, and therefore their corresponding on-resistances R1 to Rn are also the same.

In FIG. 6B, the MVAC power supply system 100 divides the starting and stopping period into a plurality of time periods according to the number of surge suppression circuits 62. If five surge suppression circuits 62 are used as a schematic example, the starting and stopping period can be divided into more than five time periods. It is assumed that the starting and stopping period is divided into five time periods, then five surge suppression circuits 62 correspond to one time period. Therefore, the switch 624 of one of the five surge suppression circuits 62 can be selected in each time period to provide a relatively large on-resistance R. That is, each surge suppression circuit 62 provides a larger on-resistance R when it is in its own time period, with a corresponding relationship. In addition, it is assumed that the starting and stopping period is divided into seven time periods, in addition to the five surge suppression circuits 62 corresponding to one period, two of them are each responsible for one additional time period, by analogy, we will not go into details here. Furthermore, since heat is generated when a current flows through the switches 624-1 to 624-$n$, the heat can be evenly distributed among the switches 624-1 to 624-$n$ through the operation mode of FIG. 6B, and this method allows the remaining switches 624-1 to 624-$n$ to have time to dissipate heat to increase heat dissipation efficiency.

In addition, except for the switches 624-1 to 624-$n$ that provide larger on-resistances R1 to Rn (it is assumed to be 624-1), the remaining switches 624-2 to 624-$n$ can preferably be controlled to be completely turned on by providing higher voltage Vc to provide a lower on-resistance R. Moreover, as shown in FIG. 6B, the MVAC power supply system 100 can preferably control the corresponding switches 624-1 to 624-$n$ sequentially according to the series-connected position of the surge suppression circuit 62 to provide greater on-resistance R1 to Rn. That is, in the first time period, the surge suppression circuit 62 at the series connector controls its own switch 624-1 to provide a larger on-resistance R1, and in the second time period, the second surge suppression circuit 62 connected in series controls its own switch 624-2 to provide a larger on-resistance R2, by analogy, we will not go into details here. Accordingly, the operation of the surge suppression circuit 62 can have better regularity and be easier to operate.

In FIG. 6C, the MVAC power supply system 100 controls the on-resistance R1 to Rn of the switch 624-1 to 624-$n$ of each surge suppression circuit 62 according to the voltage value of the input voltage Vac received by the MVAC conversion circuit 4. Specifically, each surge suppression circuit 62 not only provides substantially the same control voltage Vc so that the channels of the switches 624-1 to 624-$n$ are substantially the same, but also adjusts the on-resistances R1 to Rn of the switches 624-1 to 624-$n$ according to the voltage value of the input voltage Vac. When the voltage value of the input voltage Vac is close to the zero-crossing point (time t1), the on-resistance R1 to Rn is small, and the voltage value of the input voltage Vac starts to move toward the positive peak value from the zero-crossing point (time t2 to t3), the on-resistance R1 to Rn gradually becomes larger. When the voltage value of the input voltage Vac reaches the positive peak value, the on-resistance R1 to Rn is adjusted to the maximum value (time t4).

Furthermore, when the voltage value of the input voltage Vac is close to the zero-crossing point, the energy transmitted to the MVAC power supply system 100 is low, and therefore the surge of the input current Iac is also small; on the contrary, the surge of the input current Iac will be larger. Therefore, if the on-resistance R1 to Rn of the switch 624-1 to 624-$n$ is adjusted according to the voltage value of the input voltage Vac, it can provide a larger on-resistance R1 to Rn when the energy conduction is large and a higher impedance is required to suppress the surge; on the contrary, it can provide smaller on-resistance R1 to Rn when the energy conduction is small and the higher impedance is not required to suppress the surge. Therefore, a better surge suppression effect can be provided and at the same time the heat consumption of the surge suppressor 6 can be reduced. In particular, the values of the on-resistances R1 to Rn in FIG. 6C can be further combined with the method of equal impedance sharing (i.e., the channels are roughly the same)

as shown in FIG. 6A above. They can also be further combined with the method of providing larger resistance shown in FIG. 6B in turns. The details can be deduced from the above operation methods and will not be described again here.

In addition, in FIG. 6A to FIG. 6C, the MVAC power supply system 100 can also selectively control the on-resistance R1 to Rn of the switch 624-1 to 624-n of each surge suppression circuit 62 to be gradually smaller according to the duration of the starting and stopping period. Specifically, it can be obviously seen in FIG. 1A and FIG. 1B that the surge characteristic of the input current Iac is that the first surge is generally the highest value when a surge occurs and most of the subsequent surges return to a stable value after exponential decay. Therefore, when a surge occurs, the first surge needs to provide a large on-resistance R1 to Rn, and the peak value of subsequent surges will gradually decrease, and therefore the on-resistance R1 to Rn can be gradually decreased accordingly. Therefore, a better surge suppression effect can be provided and at the same time the heat consumption of the surge suppressor 6 can be reduced. In particular, the above-mentioned on-resistance adjustment manners of FIG. 6A to FIG. 6C can also be used in situations where the surge suppressor 6 needs to be enabled to suppress surges during the operation of the MVAC power supply system 100. The operation manner is the same as described above, and no further details will be given here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A surge suppressor connected in parallel to a circuit breaker on an input path of a medium-voltage alternative-current conversion circuit, the surge suppressor comprising:
   a plurality of surge suppression circuits, and each surge suppression circuit comprising:
   a rectification circuit comprising an alternative-current terminal and a rectification terminal, and the alternative-current terminals of the surge suppression circuits coupled in series,
   a switch coupled to the rectification terminal,
   a controller configured to receive a control command, and provide a control signal according to the control command, and
   a conversion circuit coupled to the controller and the switch, and the conversion circuit configured to provide a control voltage modulated by the control signal,
   wherein the control voltage is configured to adjust an on-resistance of the switch so as to adjust a magnitude of a first current flowing through the switch, and
   wherein when the surge suppression circuits are enabled during a starting and stopping period of enabling or disabling the medium-voltage alternative-current conversion circuit to adjust the on-resistance so as to limit a magnitude of an input current received by the medium-voltage alternative-current conversion circuit.

2. The surge suppressor as claimed in claim 1, wherein the conversion circuit comprises:
   a switching circuit coupled to the controller, and
   a filtering circuit coupled to the switching circuit and the switch, wherein the switching circuit is switched on according to the control signal so that the filtering circuit generates the control voltage.

3. The surge suppressor as claimed in claim 2, wherein the filtering circuit comprises:
   an inductor coupled to the switching circuit, and
   a capacitor coupled to the inductor and the switch,
   wherein the controller is configured to control the switching circuit to be switched on to control a working voltage to charge the inductor; or control the inductor to release energy to the capacitor; the control voltage is generated at two terminals of the capacitor according to the energy storage and the energy release of the inductor.

4. The surge suppressor as claimed in claim 2, wherein the switching circuit comprises:
   an upper-bridge switch coupled to the controller and the filtering circuit, and the upper-bridge switch configured to receive a working voltage, and
   a lower-bridge switch coupled to the upper-bridge switch and the controller,
   wherein the control signal comprises an upper control signal and a lower control signal in complementary; when the upper control signal turns on the upper-bridge switch, the working voltage stores energy to the filtering circuit through the upper-bridge switch; when the lower control signal turns on the lower-bridge switch, the filtering circuit releases energy through the lower-bridge switch.

5. The surge suppressor as claimed in claim 4, wherein the conversion circuit further comprises:
   a current-limiting resistor coupled to the upper-bridge switch, the lower-bridge switch, and the filtering circuit,
   wherein when the upper-bridge switch is turned on, the current-limiting resistor is configured to limit a magnitude of a second current flowing from the working voltage to the filtering circuit through the upper-bridge switch.

6. The surge suppressor as claimed in claim 2, wherein the switching circuit comprises:
   a lower-bridge switch configured to receive a working voltage, and the lower-bridge switch coupled to the controller and the filtering circuit,
   wherein the control signal is a lower-bridge control signal; when the lower-bridge control signal does not turn on the lower-bridge switch, the working voltage is configured to charge the filtering circuit; when the lower-bridge control signal turns on the lower-bridge switch, the filtering circuit releases energy through the lower-bridge switch.

7. The surge suppressor as claimed in claim 6, wherein the conversion circuit further comprises:
   a current-limiting resistor configured to receive the working voltage, and the current-limiting resistor coupled to the lower-bridge switch and the filtering circuit,
   wherein when the lower-bridge switch is not turned on, the current-limiting resistor is configured to limit a magnitude of a second current flowing from the working voltage to the filtering circuit.

8. The surge suppressor as claimed in claim 1, wherein the rectification circuit is a full-bridge circuit, and is configured to provide the first current flowing through the switch in a fixed direction.

9. The surge suppressor as claimed in claim 1, wherein each surge suppression circuit further comprises:

a protection circuit connected in parallel to the alternative-current terminal, and the protection circuit comprising a variable resistor and at least one clamping circuit, wherein when the circuit breaker and the surge suppressor are both disconnected, the protection circuit is configured to limit a voltage at the alternative-current terminal to be less than or equal to a predetermined voltage.

10. A method of operating a surge suppressor, the surge suppressor connected in parallel to a circuit breaker on an input path of a medium-voltage alternative-current conversion circuit, and the surge suppressor comprising a plurality of surge suppression circuits coupled in series, and each surge suppression circuit comprising a rectification terminal and a switch coupled to the rectification terminal, the method of operating the surge suppressor comprising steps of:

(a) receiving a control command, and providing a control signal according to the control command, (b) providing a control voltage modulated by the control signal, (c) adjusting an on-resistance of the switch according to the control voltage, and (d) adjusting a magnitude of a first current flowing through the switch by adjusting the on-resistance, (e) setting a starting and stopping period of enabling or disabling the medium-voltage alternative-current conversion circuit, (f) enabling the surge suppression circuits during the starting and stopping period, and operating each of the surge suppression circuits to perform step (a) to step (d), and (g) disabling the surge suppression circuits when the starting and stopping period ends.

11. The method of operating the surge suppressor as claimed in claim 10, wherein step (f) further comprises a step of:

(f1) controlling the switch of each of the surge suppression circuits to provide the same on-resistance.

12. The method of operating the surge suppressor as claimed in claim 10, wherein step (f) further comprises a step of:

(f2) controlling the on-resistance of each of the surge suppression circuits according to a magnitude of an input voltage received by the medium-voltage alternative-current conversion circuit.

13. The method of operating the surge suppressor as claimed in claim 10, wherein step (f) further comprises steps of:

(f31) dividing the starting and stopping period into a plurality of time periods according to the number of the surge suppression circuits, and (f32) selecting the switch of one of the surge suppression circuits in each time period to provide a larger on-resistance.

14. The method of operating the surge suppressor as claimed in claim 13, wherein step (f32) further comprises a step of:

(f322) sequentially controlling the corresponding switches to provide larger on-resistances according to the position of the surge suppression circuits connected in series.

15. The method of operating the surge suppressor as claimed in claim 10, wherein step (f) further comprises a step of:

(f4) controlling the on-resistance of the switch of each of the surge suppression circuits to be gradually smaller according to a duration of the starting and stopping period.

* * * * *